United States Patent
Yamamoto et al.

(10) Patent No.: US 9,337,894 B2
(45) Date of Patent: May 10, 2016

(54) ELECTROMAGNETIC WAVE TRANSMISSION MEDIUM AND ELECTROMAGNETIC WAVE TRANSMISSION SYSTEM

(75) Inventors: Keisuke Yamamoto, Kokubunji (JP);
Hiroshi Shinoda, Kodaira (JP);
Takahide Terada, Tokyo (JP)

(73) Assignee: Hitachi, Ltd., Tokyo (JP)

(*) Notice: Subject to any disclaimer, the term of this patent is extended or adjusted under 35 U.S.C. 154(b) by 452 days.

(21) Appl. No.: 13/811,944

(22) PCT Filed: Jul. 29, 2011

(86) PCT No.: PCT/JP2011/067386
§ 371 (c)(1),
(2), (4) Date: Jan. 24, 2013

(87) PCT Pub. No.: WO2012/029472
PCT Pub. Date: Mar. 8, 2012

(65) Prior Publication Data
US 2013/0147573 A1    Jun. 13, 2013

(30) Foreign Application Priority Data
Sep. 3, 2010    (JP) .................... 2010-198019

(51) Int. Cl.
*H04B 3/50* (2006.01)
*H04B 3/52* (2006.01)
*H01Q 1/00* (2006.01)
*H01Q 13/20* (2006.01)

(52) U.S. Cl.
CPC ........... *H04B 3/50* (2013.01); *H01Q 1/007* (2013.01); *H01Q 13/20* (2013.01); *H04B 3/52* (2013.01)

(58) Field of Classification Search
CPC ................ H04B 3/50; H04B 3/52
See application file for complete search history.

(56) References Cited

U.S. PATENT DOCUMENTS

| | | | | |
|---|---|---|---|---|
| 3,610,933 A | * | 10/1971 | Shaver et al. | 398/115 |
| 3,809,966 A | * | 5/1974 | Tirrell et al. | 361/601 |
| 2012/0206314 A1 | * | 8/2012 | Kobayashi | 343/841 |

FOREIGN PATENT DOCUMENTS

| | | | |
|---|---|---|---|
| GB | 1393424 A | * | 5/1975 |
| JP | 2007-82178 A | | 3/2007 |
| JP | 2008-177881 A | | 7/2008 |
| WO | WO 2007/066406 A1 | | 6/2007 |

OTHER PUBLICATIONS

International Search Report including English Translation dated Aug. 23, 2011 (Two (2) pages).

* cited by examiner

*Primary Examiner* — Matthew M Barker
(74) *Attorney, Agent, or Firm* — Crowell & Moring LLP

(57) ABSTRACT

The disclosed electromagnetic wave transmission medium prevents electromagnetic leakage during high-power electromagnetic wave transmission. The sheet-form electromagnetic wave transmission medium is configured from a first mesh conductor used in transmission of electromagnetic waves having a first power; and a second mesh conductor used in transmission of electromagnetic waves having a second power. By using two mesh conductors, when said sheet-form electromagnetic wave transmission medium is used, the conduction density of the surface region where electromagnetic waves are extracted to be used for power supply assumes a coarser state than that of the other surface region.

7 Claims, 4 Drawing Sheets

ELECTROMAGNETIC WAVE TRANSMISSION MEDIUM AND ELECTROMAGNETIC WAVE TRANSMISSION SYSTEM

TECHNICAL FIELD

The present invention relates to an electromagnetic transmission medium in a face-form (sheet-form) which can simultaneously transmit plural kinds of electromagnetic waves while facilitating a reduction in an electromagnetic leakage as well as a transmission system using the medium for a transmission line.

BACKGROUND ART

There is proposed a combination of an electromagnetic transmission medium interposing a dielectric by one mesh conductor and one sheet-form conductor, and an electromagnetic wave interface of extracting an electromagnetic wave effused from the mesh conductor as a transmission system realizing noncontact electromagnetic wave transmission by a simple configuration.

According to the system described above, the electromagnetic wave effused from the mesh conductor can be extracted from an arbitrary position of the sheet-form conductor. Therefore, attention is paid to the above-described system as one of means of realizing communication or power feeding without connection.

However, since according to the above-described system, the electromagnetic wave effused from the mesh conductor is used, in a case where an electromagnetic wave leaked from the mesh conductor is considerable, there poses a technical problem that a transmission loss or an interference wave is enlarged. Particularly, for a use of power feeding, there is frequently used an electromagnetic wave having a power larger than that of a use of communication. Therefore, it is necessary to restrain a leaked electromagnetic wave further strictly.

CITATION LIST

Patent Literature

Patent Literature 1: Japanese Unexamined Patent Application Publication No. 2007-082178

SUMMARY OF INVENTION

Technical Problem

As described above, when an electromagnetic wave having a large power is going to be transmitted by passing a sheet-form electromagnetic wave transmission medium, there poses a problem that a power leaked from a surface of the transmission medium is increased.

Solution to Problem

A sheet-form electromagnetic transmission medium according to the present invention is configured by a first mesh conductor used for transmission of an electromagnetic wave having a first power, and a second mesh conductor used for transmission of an electromagnetic wave having a second power.

Advantageous Effects of Invention

According to the present invention, there is realized a reduction in an electromagnetic leakage when an electromagnetic wave having a large power is transmitted by properly using two of the mesh conductors.

DESCRIPTION OF EMBODIMENTS

An explanation will be given of embodiments of the present invention in reference to the drawings as follows. Incidentally, a medium structure or a system configuration described later is only an example for explaining the present invention. The present invention includes an invention combining portions of a medium structure or a system configuration described below, an invention combining a medium structure or a system configuration described later with a known technology or an invention of substituting a medium structure or a system configuration described later for a known technology.

(First Embodiment)

First, an explanation will be given of a first embodiment in reference to the drawings. In the following, a case of transmitting an electromagnetic wave having a relatively large power is described as "power feeding", and a case of transmitting an electromagnetic wave having a relatively small power is described as "transmission" for convenience of explanation. However, an electromagnetic wave transmission medium according to the present invention is not necessarily on the premise of being used limitedly to a combination of "power feeding" and "communication". That is, the present invention can be used for an arbitrary transmission use so far as two kinds of electromagnetic waves having different powers are transmitted.

Figure 1:
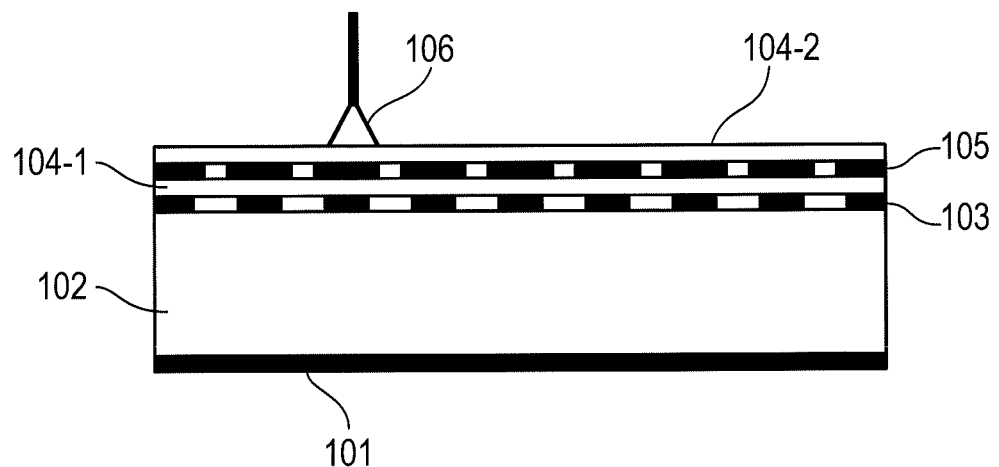
FIG. 1 is a view showing an example of a sectional structure of an electromagnetic wave transmission medium according to the present invention.

FIG. 1 shows an example of a sectional structure of an electromagnetic wave transmission medium according to the first embodiment. In the drawing, notation 101 designates a conductor layer, notation 102 designates a dielectric layer, notation 103 designates a mesh conductor layer having a low ratio of conductive area, notation 105 designates a mesh conductor layer having a high ratio of conductive area, and notation 106 designates an electromagnetic wave interface of extracting an electromagnetic wave from the electromagnetic wave transmission medium. Notations 104-1 and 104-2 designate protection layers of respectively protecting the mesh conductor layers, and either one or both thereof can be omitted depending on a use thereof. The protection layer may be attached to a contact face of the electromagnetic wave interface 106 without being attached to surfaces of the mesh conductor layers 103 and 105.

According to the electromagnetic wave transmission medium shown in FIG. 1, there is configured a two-layer structure of the mesh conductor layers. The mesh conductor layer 103 having a relatively coarse conductive area (or low ratio of conductive area) is arranged on a lower layer side (side of dielectric 102), and the mesh conductor layer 105 having a relatively dense conductive area (or high ratio of conductive area) is arranged on an upper layer side (side of electromagnetic wave interface 106). That is, in the case of FIG. 1, the ratio of conductive area of the mesh conductor layer on the side of the electromagnetic wave interface 106 for drawing an electromagnetic wave is made to be relatively high. The structure signifies that the mesh conductor layer on the upper layer side can be made to function as an electromagnetic shield of the mesh conductor layer on the lower layer side. It is preferable that the protection layers 104-1 and 104-2 and the mesh conductor layer 105 on the upper layer side are of a material and/or a structure easy to be worked by a cutter. Particularly, it is preferable that the protection layer and the mesh conductor layer can easily be exfoliated from each other at a boundary face therebetween. An intensity of extracting an electromagnetic wave from the mesh conductor layer 103 on the lower layer side can be increased by exposing the mesh conductor layer 103 on the lower layer side by exfoliating the mesh conductor layer 105 on the upper layer side.

Figure 2:
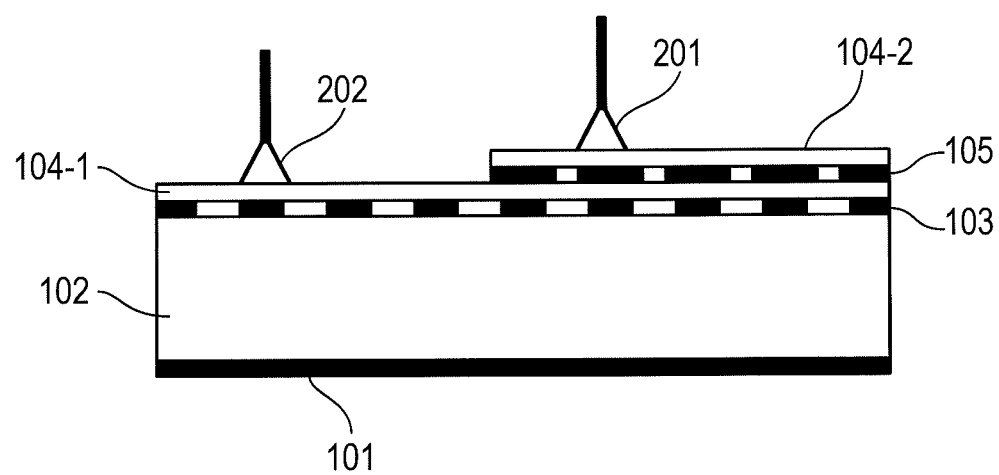
FIG. 2 is a view showing an example of a used mode in a case where an electromagnetic wave transmission system is constructed by using an electromagnetic transmission medium according to the present invention.

FIG. 2 shows an example of a used mode suitable for a case of transmitting an electromagnetic wave for power feeding and an electromagnetic wave for communication simultaneously by using the electromagnetic wave transmission medium according to the present embodiment. In the drawing, notation 201 designates an electromagnetic wave interface used for communication, and notation 202 designates an electromagnetic wave interface used for power feeding. That is, according to an example of a preferable used mode, an electromagnetic wave for communication is transmitted by using the mesh conductor layer 105 on the upper layer side, and an electromagnetic wave for power feeding is transmitted by using the mesh conductor layer 103 on the lower layer side. The mesh conductor layer 105 on the upper layer side is operated also as an electromagnetic shield of the mesh conductor layer 103 on the lower layer side as described above. Therefore, when the electromagnetic wave interface 202 used for power feeding is arranged on a surface of the protection layer 104-2, an electromagnetic wave cannot efficiently be extracted.

Hence, in FIG. 2, the protection layer 104-1 of the lower layer is exposed by partially removing the mesh conductor layer 105 having the high ratio of conductive area, and the electromagnetic wave interface 202 for power feeding is attached to a portion of the corresponding region. There can be drawn a power larger than a power in a case of extracting an electromagnetic wave by interposing the mesh conductor layer 105 having the high ratio of conductive area therebetween by attaching the electromagnetic wave interface 202 for power feeding to the mesh conductor layer 203 by interposing only the protection layer 104-1 therebetween in this way.

On the other hand, the electromagnetic wave interface 201 for communication is brought into contact with the mesh conductor layer 105 having the high ratio of conductive area. Therefore, only a small power can be extracted. However, a weak signal is generally used for communication, and therefore, the communication is sufficiently made even by an electromagnetic wave leaked from the mesh conductor layer 105 having the high ratio of conductive area.

A transmission efficiency of an electromagnetic wave for a communication use which is realized by passing the mesh conductor layer 105 having the high ratio of conductive area is not necessarily high in the case of the used mode shown in FIG. 2 as described above. On the other hand, there is anticipated an effect that there is also reduced an electromagnetic wave leaked to outside from other than a region of exposing the mesh conductor layer 103 having the low ratio of conductive area (a region covered by the mesh conductor layer 105 having the high ratio of conductive area). That is, there is increased a transmission efficiency for a power feeding use of transmitting an electromagnetic wave via the electromagnetic wave interface 202 for the power feeding use in contact with the mesh conductor layer 103 having the low ratio of conductive area simultaneously with reducing a total amount of an electromagnetic wave leaked to outside from an entire surface of the electromagnetic wave transmission medium. The used mode shown in FIG. 2 can increase a transmission efficiency of a total of a system in comparison with a case of using only one kind of a mesh conductor layer as in a system of a background art in consideration of the fact that a power larger than a power for communication is transmitted in power feeding.

According to the used mode shown in FIG. 2, it is preferable to use different frequencies for frequencies of electromagnetic waves for communication and for power feeding and a frequency F1 of an electromagnetic wave for communication is higher than a frequency F2 of an electromagnetic wave for power feeding (F1>F2). Because the higher the frequency, the larger the electromagnetic wave leaked to outside from the mesh conductor layer. There is increased a power of an electromagnetic which can be extracted via the electromagnetic wave interface 201 for communication in contact with the mesh conductor layer 105 having the high ratio of conductive area by making the frequency F1 of the electromagnetic wave for communication higher. Also, there can be reduced a power of an electromagnetic wave for power feeding leaked from the mesh conductor layer 105 having the high ratio of conductive area by making the frequency F2 of the electromagnetic wave for power feeding lower. At this occasion, the density of the mesh conductor layer 103 having the low ratio of conductive area can be selected independently from that of the mesh conductor layer 105 having the high ratio of conductive area. Therefore, when the density of the mesh conductor layer 103 having the low ratio of conductive area is determined in accordance with the frequency of the electromagnetic wave for power feeding, the transmission efficiency can be optimized, and the power for power feeding which can be extracted from the transmission medium may not be reduced.

The mesh conductor layers are configured by the laminated structure of the plural mesh conductor layers in the electromagnetic wave transmission medium according to the first embodiment as shown in FIG. 1 and FIG. 2. A user can partially remove a mesh layer having a high ratio of conductive area from an arbitrary surface portion of the electromagnetic wave transmission medium in accordance with a position of arranging an electronic device which needs power feeding owing to the configuration. That is, a user can freely determine a region portion used for power feeding.

Figure 3:
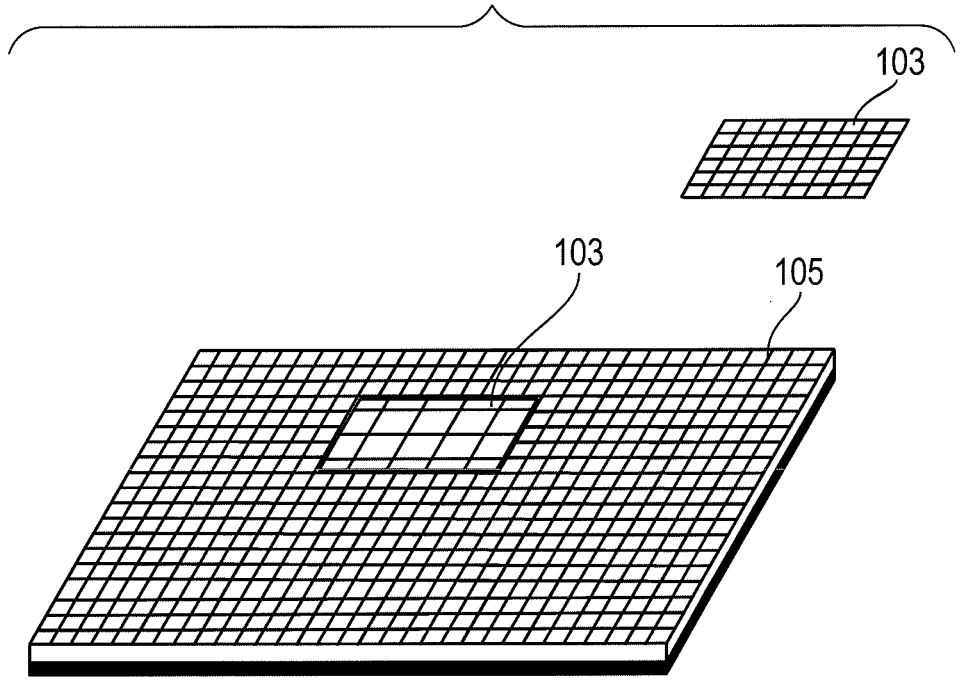
FIG. 3 is a view for explaining a state in which in an electromagnetic transmission medium laminated with two of mesh conductors having different densities, a conductor on a surface side is partially removed.

FIG. 3 shows a behavior of partially removing the mesh conductor layer 105 having the high ratio of conductive area on the surface side according to the present embodiment. FIG. 3 is shown by attaching the same notation to a portion of FIG. 3 in correspondence with that of FIG. 2. Incidentally, FIG. 3 is shown by omitting the protection layer for convenience of an explanation. In the drawing, notation 301 designates the mesh conductor layer having the high ratio of conductive area removed from the surface. As shown in FIG. 3, the mesh conductor layer 103 having the low ratio of conductive area configuring a matrix is exposed only at a portion of removing the mesh conductor layer 301 having the high ratio of conductive area. That is, there can be realized a state in which the conductive area is coarse only at the surface region of extracting the electromagnetic wave for power feeding, and there can be realized a state in which the conductive area is dense at the other surface region.

Here, it is preferable that the mesh conductor layer 105 having the high ratio of conductive area and the mesh conductor layer 103 having the low ratio of conductive area are pasted together by using an adhesive, a friction force, or a pressure. In this case, only the mesh conductor layer having the high ratio of conductive area can be removed by, for example, making a cut from the surface side of the mesh conductor layer 105 having the high ratio of conductive area, and exfoliating the mesh conductor layer 105 from the mesh conductor layer 103 having the low ratio of conductive area configuring the matrix. Otherwise, there can be used also an irreversible method using heat or pressure of melting, cutting, or boring the mesh conductor layer 105 as a method of removing the mesh conductor layer 105 having the high conductor density.

An electromagnetic wave for communication can be transmitted to the mesh conductor layer 105 on the upper layer side while transmitting an electromagnetic wave for power feeding to the mesh conductor layer 103 on the lower layer side by adopting the electromagnetic transmission medium having a structure of arranging the mesh conductor layer 103 having the low ratio of conductive area on the lower side and arranging the mesh conductor layer 105 having the high ratio of conductive area on the upper layer side. Furthermore, the mesh conductor layer 105 on the upper layer is operated as the electromagnetic shield at other than a portion of attaching the electromagnetic wave interface 202 for power feeding while transmitting an electromagnetic wave for power feeding having a large power. Therefore, there can be realized an electromagnetic wave transmission medium having a small amount of an electromagnetic wave leaked from the surface.

(Second Embodiment)

According to the first embodiment, there is shown a case in which the ratio of conductive area of the mesh conductor layer 105 on the upper layer is higher than the ratio of conductive area of the mesh conductor layer 103 on the lower layer side.

However, in a case of adopting a laminated structure of two mesh conductors, there can also be adopted a structure in which the ratio of conductive area of the mesh conductor layer 105 on the upper layer side (electromagnetic wave interface side) is equal to the ratio of conductive area of the mesh conductor layer 103 on the lower layer side (dielectric layer side), or lower than the ratio of conductive area of the mesh conductor layer 103.

Figure 4:
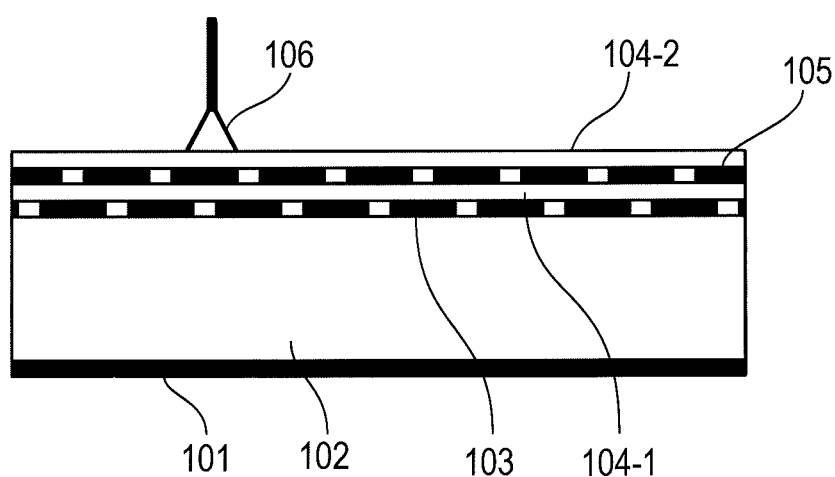
FIG. 4 is a view showing an example of a sectional structure of an electromagnetic wave transmission medium laminated with two of mesh conductors having the same density.

FIG. 4 shows an example of a sectional structure of an electromagnetic wave transmission medium in a case in which the conduction densities of the mesh conductor layers 103 and 105 are the same. Incidentally, FIG. 4 is shown by attaching the same notation to a portion of FIG. 4 in correspondence with that of FIG. 1. As shown in FIG. 4, even when the ratio of conductive area of the mesh conductor layer 105 on the upper layer side is not larger than the ratio of conductive area of the mesh conductor layer 103 on the lower layer side, a ratio of conductive area in a case of viewing a surface of the electromagnetic wave transmission medium from outside (case of integrally viewing the two mesh conductor layers 103 and 105) can be made to be higher than a ratio of conductive area of a single mesh conductor layer. Therefore, even in a case of laminating mesh conductor layers having the same ratio of conductive area as in the case of the present embodiment, there can be realized an effect similar to that of the first embodiment (case in which the ratio of conductive area of the mesh conductor layer 105 on the upper layer side is higher than the ratio of conductive area of the mesh conductor layer 103 on the lower layer side).

In a case in which the ratio of conductive area of the mesh conductor layer 105 on the upper layer side (electromagnetic wave interface side) is the same as the ratio of conductive area of the mesh conductor layer 103 on the lower layer side (dielectric layer side), a ratio of conductive area of a total of the mesh conductor layers viewed transparently from the surface side can be made to be higher than the ratio of conductive area of the mesh conductor layer 103 on the lower layer side (dielectric side) by laminating such that positions of openings of meshes are shifted from each other as shown in FIG. 4. That is, the electromagnetic wave transmission medium according to the second embodiment can realize an effect similar to that of the electromagnetic wave transmission medium according to the first embodiment.

(Third Embodiment)

An explanation has been given of a structure of laminating two of the mesh conductor layers according to the above-described two embodiments. However, in a case in which a position of a region used for power feeding is determined beforehand, there can also be adopted a structure of arranging two mesh conductor layers having different conduction densities on the same flat face as in the present embodiment. Also in the case of the embodiment, assume that two mesh conductor layers signify those for power feeding and for communication, and a ratio of conductive area of a mesh conductor layer for power feeding is lower than a ratio of conductive area of a mesh conductor layer for communication.

Figure 5:
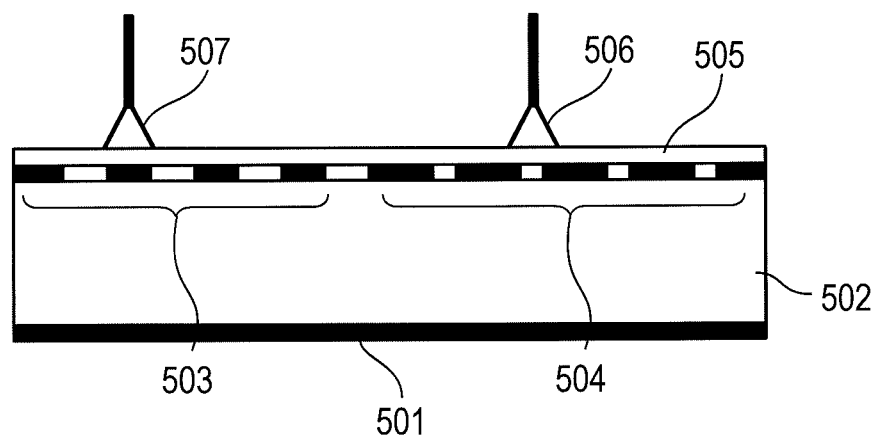
FIG. 5 is a view showing an example of a sectional structure of an electromagnetic transmission medium including two of mesh conductors having different densities on the same plane.

FIG. 5 shows an example of a sectional structure of an electromagnetic wave transmission medium of this kind. An electromagnetic transmission medium shown in FIG. 5 is configured by two kinds of mesh conductor layers having different densities. In the drawing, notation 501 designates a conductor layer, notation 502 designates a dielectric layer, notation 503 designates a mesh conductor layer having a low ratio of conductive area, notation 504 designates a mesh conductor layer having a high ratio of conductive area, notation 505 designates a protection layer, notation 506 designates an electromagnetic wave interface for communication, and notation 507 designates an electromagnetic wave interface for power feeding.

In the case of the embodiment, there is arranged the mesh conductor layer 503 for power feeding having a large leaked electromagnetic wave on a surface of the medium. However, whereas in a case of an electromagnetic wave transmission medium for power feeding use of a background art, an entire surface thereof is configured by a mesh conductor layer having a low ratio of conductive area, in the case of the present embodiment, a region of arranging the mesh conductor layer 503 having the low ratio of conductive area can be limited to one portion of the electromagnetic transmission medium, and the other region can be covered by the mesh conductor layer 504 for communication which has a high ratio of conductive area and to which an electromagnetic wave for communication having a small power is transmitted. Therefore, an electromagnetic leakage in view from a total of the electromagnetic wave transmission medium can considerably be reduced in comparison with the electromagnetic wave transmission medium of the background art type similar to the cases of the embodiments described above.

(Fourth Embodiment)

Figure 6:
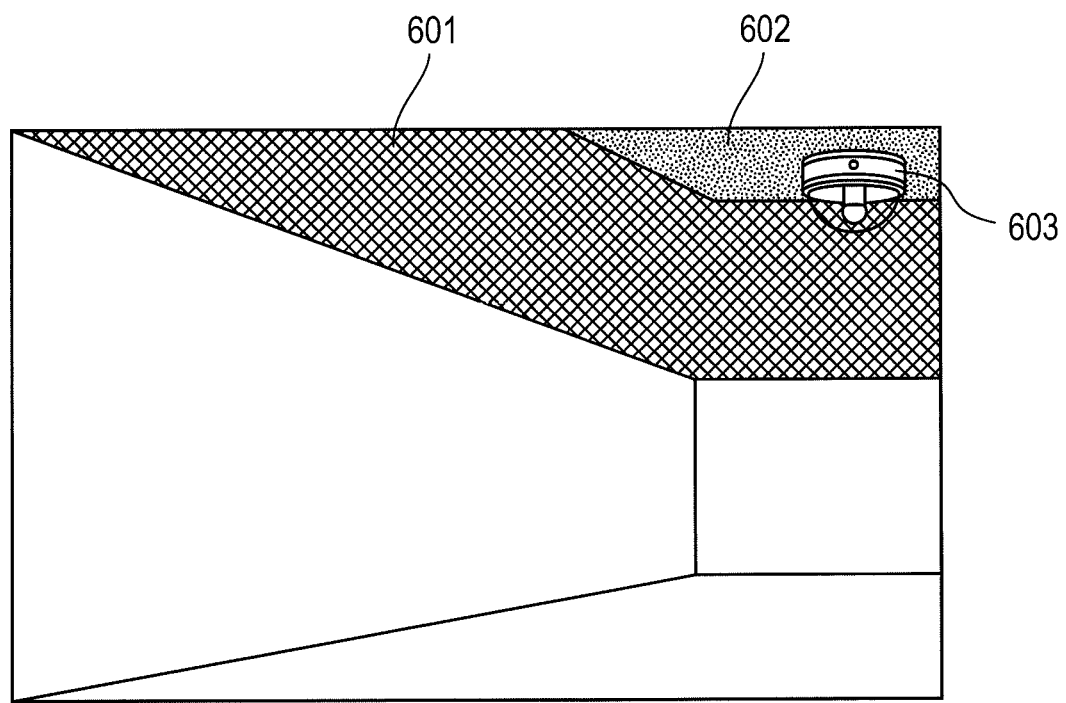
FIG. 6 is a view showing an example of constructing a monitoring system using an electromagnetic wave transmission medium according to the present invention.

An explanation will be given of application examples of electromagnetic transmission media according to the respective embodiments described above as follows. FIG. 6 shows an example of constructing a monitoring system (electromagnetic wave transmission system) by using the electromagnetic wave transmission media according to the respective embodiments.

In the case of FIG. 6, an electromagnetic wave transmission medium is laid on a ceiling. In the drawing, notation 601 designates a mesh conductor layer for communication having a high ratio of conductive area. Notation 602 designates a mesh conductor layer for power feeding having a low ratio of conductive area which is exposed by removing the mesh conductor layer 601 having the high ratio of conductive area, or which is previously arranged as in the third embodiment. Notation 603 designates a monitoring camera which is operated by being fed with a power from the mesh conductor layer 602.

As shown in FIG. 6, an electromagnetic wave can be transmitted to an arbitrary position of the ceiling by laying the electromagnetic wave transmission medium over an entire face of the ceiling. That is, communication and/or power feeding can be carried out with an arbitrary point within the range of the ceiling. Incidentally, it is preferable to configure the mesh conductor layer 602 having the low ratio of conductive area at only a surrounding of a portion of attaching the monitoring camera 603 in order to reduce an electromagnetic wave used for power feeding from being leaked. Incidentally, an area of laying the mesh conductor layer 602 having the low ratio of conductive area is illustrated to be considerably large to make a difference of the region easy to identify.

An electromagnetic wave interface for extracting an electromagnetic wave from the electromagnetic wave transmission medium is incorporated at a face of the monitoring camera 603 in contact with the electromagnetic wave transmission medium, and a signal and a power are made to be able to be received through the electromagnetic wave transmission medium. Naturally, it is necessary to attach the electromagnetic wave interface for communication to be able to communicate with the mesh conductor layer 601 and attach the electromagnetic wave interface for power feeding to be able to communicate with the mesh conductor layer 602. Incidentally, a wireless communication can also be used for the communication so far as the power can be fed to the monitoring camera 603.

When a position of the monitoring camera 603 is changed, an efficient power feeding can be carried out by restoring the mesh conductor layer which is removed when the monitoring camera 603 is attached to the present position, and removing the mesh conductor layer having the high ratio of conductive area at a newly installed position. As shown in FIG. 6, an effect of reducing the electromagnetic leakage can further be realized by using the electromagnetic transmission media according to the first embodiment through the third embodiment for a use of enlarging a range of laying the electromagnetic wave transmission medium.

(Fifth Embodiment)

Successively, an explanation will be given of a configuration example of a communication system (electromagnetic wave transmission system) using the electromagnetic wave transmission media according to the first embodiment to the third embodiment.

Figure 7:
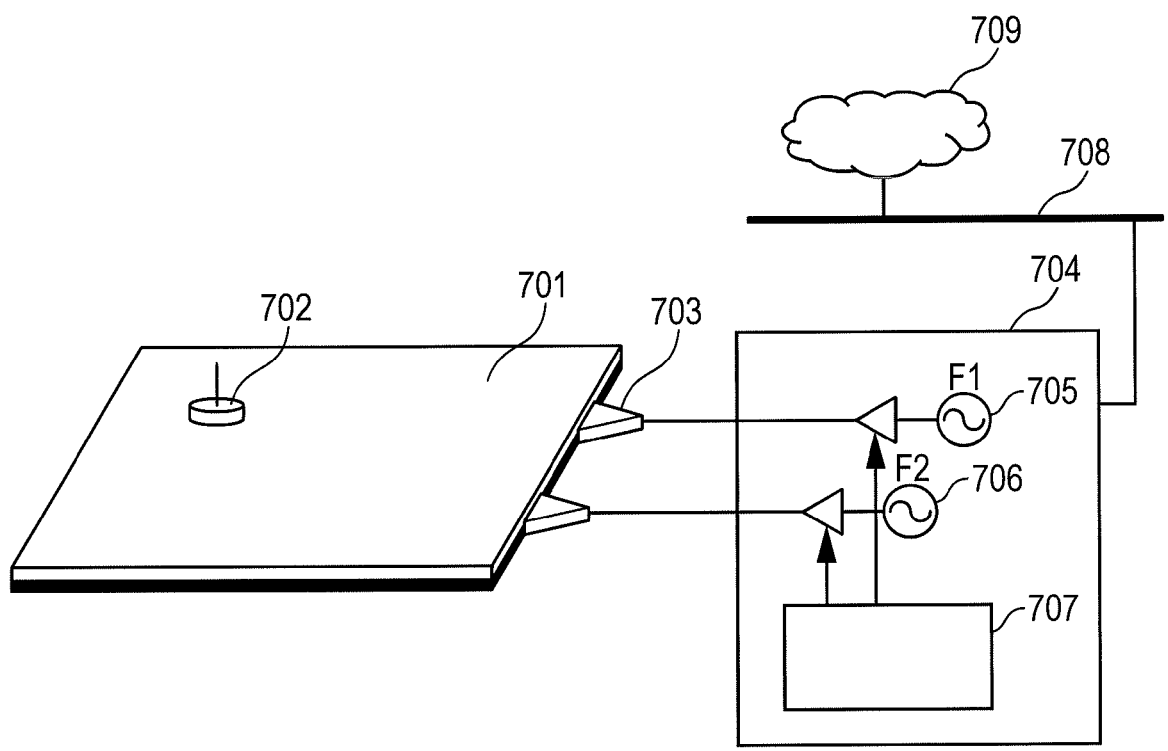
FIG. 7 is a view showing an example of an apparatus configuration of a transmission system using an electromagnetic wave transmission medium according to the present invention.

FIG. 7 shows a configuration example of an electromagnetic wave transmission system. Notation 701 designates the electromagnetic transmission medium explained in the respective embodiments, notation 702 designates an electromagnetic wave interface of extracting an electromagnetic wave, notation 703 designates an electromagnetic wave interface on a side of a communication/power feeding station, and notation 704 designates the communication/power feeding station. The electromagnetic wave interface 703 on the communication/power feeding station side may be brought into a state of being fixed to the transmission medium, or may be constructed by a configuration of being hermetically closed in the transmission medium.

The communication/power feeding station 704 includes a signal source 705 having a frequency F1 and a signal source 706 having a frequency F2, and the respective signal sources transmit electromagnetic waves at different frequencies. In the drawing, amplifiers amplifying electromagnetic waves are inserted between the signal sources 705 and 706 and the electromagnetic wave interface 703. The communication/power feeding station 704 transmits and receives power feeding and signals between the communication/power feeding station 704 and the electromagnetic wave transmission medium 701. The electromagnetic waves having the frequency F1 and the frequency F2 are extracted via the electromagnetic wave interface 702 in correspondence with respective mesh conductor layers configuring the electromagnetic wave transmission medium 701. A controller 707 controls transmission and reception of a communication signal or transmission of a power signal which are carried out by way of the electromagnetic wave transmission medium 701. In the case of FIG. 7, the communication/power feeding station 704 is connected to a wired interface 708. The communication/power feeding station 704 realizes procurement of a power source and a connection to the Internet 709 via the wired interface 708. Incidentally, the communication/power feeding station 704 is also mounted with an electronic circuit (receiving circuit) for receiving a communication from the electromagnetic wave interface 702 although not illustrated in the drawing.

(Other Embodiment)

According to the embodiments described above, an explanation has been given of a case of realizing the electromagnetic wave transmission medium by the laminated structure or the flat face arranging structure of the two mesh conductor layers. However, the electromagnetic transmission medium may be configured by using three or more of the mesh conductor layers. In that case, it is preferable that the respective mesh conductor layers are allocated with different frequencies for transmitting the electromagnetic waves, and it is preferable that a frequency of a lower side is low, and a frequency on an upper layer side is high.

The mesh conductor layers according to the above-described embodiments include a mesh conductor layer in which a conductor is knitted in a mesh-like shape as well as a mesh conductor layer in which a conductor is formed in the mesh-like shape. A size and a shape of an opening of the mesh conductor layer may be arbitrary. For example, the shape may be a rectangular shape as shown in FIG. 3, or maybe a circular shape, a polygonal shape or the like. A difference of an opening size at this occasion includes a difference of an opening size by a difference of a line width of a conductor pattern configuring a mesh conductor layer.

LIST OF REFERENCE SIGNS 101 conductor layer
102 dielectric layer
103 mesh conductor layer having low ratio of conductive area
104-1 protection layer
104-2 protection layer
105 mesh conductor layer having high ratio of conductive area
106 electromagnetic wave interface
201 electromagnetic wave interface for communication
202 electromagnetic wave interface for power feeding
301 removed mesh conductor layer having high ratio of conductive area
501 conductor layer
502 dielectric layer
503 mesh conductor layer having low ratio of conductive area
504 mesh conductor layer having high ratio of conductive area
506 electromagnetic wave interface for communication
507 electromagnetic wave interface for power feeding
601 mesh conductor layer having high ratio of conductive area
602 mesh conductor layer having low ratio of conductive area
603 monitoring camera
701 electromagnetic wave transmission medium
702 electromagnetic wave interface
703 electromagnetic wave interface on communication/power feeding station side
704 communication/power feeding station
705 signal source of frequency F1
706 signal source of frequency F2
707 controller
708 wired interface
709 Internet

The invention claimed is:

1. An electromagnetic wave transmission medium which is a sheet-shaped electromagnetic wave transmission medium, the electromagnetic wave transmission medium comprising:
 a conductor layer;
 a dielectric layer provided on the conductor layer;
 a first mesh conductive layer, provided on the dielectric layer, configured to transmit an electromagnetic wave having a first power; and
 a second mesh conductive layer, provided on the dielectric layer, configured to transmit an electromagnetic wave having a second power;
 wherein the first mesh conductive layer and the second mesh conductive layer have different mesh densities.

2. The electromagnetic wave transmission medium according to claim 1, wherein the second mesh conductive layer is provided on the first mesh conductive layer and a mesh density of the second mesh conductive layer is larger than a mesh density of the first mesh conductive layer.

3. The electromagnetic wave transmission medium according to claim 1, wherein the first mesh conductive layer and the second mesh conductive layer are arranged in a same flat face.

4. An electromagnetic wave transmission system comprising:
 a sheet-shaped electromagnetic wave transmission medium; and
 an interface configured to apply an electromagnetic wave to the electromagnetic wave transmission medium,
 wherein the electromagnetic transmission medium includes a conductive layer, a dielectric layer provided on the conductive layer, a first mesh conductive layer, formed above the dielectric layer, configured to transmit an electromagnetic wave having a first power, and a second mesh conductive layer, provided on the dielectric layer, configured to transmit an electromagnetic wave having a second power; and
 wherein the interface includes a first interface configured to transmit a first electromagnetic wave through the first mesh conductive layer, and a second interface configured to transmit a second electromagnetic wave through the second mesh conductive layer;
 wherein the first interface transmits the first electromagnetic wave having the first power at a first frequency;
 wherein the second interface transmits the second electromagnetic wave having the second power at a second frequency that is different from the first frequency of the first interface; and
 wherein the first mesh conductive layer and the second mesh conductive layer have different mesh densities.

5. The electromagnetic wave transmission system according to claim 4, wherein the second mesh conductive layer is formed above the first mesh conductive layer and a mesh density of the second mesh conductive layer is larger than a mesh density of the first mesh conductive layer.

6. The electromagnetic wave transmission system according to claim 4, wherein the first mesh conductive layer and the second mesh conductive layer are arranged in a same flat face.

7. The electromagnetic were transmission system according to claim 4, wherein the second mesh conductive layer is removable from the dielectric layer.

* * * * *